United States Patent [19]

Blomgvist

[11] 4,321,292
[45] Mar. 23, 1982

[54] METHOD OF MANUFACTURING SHRINKABLE SLEEVES FROM A CROSS-LINKING PLASTICS MATERIAL

[75] Inventor: Harald Blomgvist, Vasa, Finland

[73] Assignee: Oy Wiik & Hoglund AB, Vasa, Finland

[21] Appl. No.: 162,072

[22] Filed: Jun. 23, 1980

[51] Int. Cl.³ ............................................. B29D 7/24
[52] U.S. Cl. .................................... 428/36; 264/150; 264/230; 264/236; 264/290.2
[58] Field of Search ............... 264/150, 230, DIG. 71, 264/565, 567–568, 290.2, 236; 425/392, 393; 428/36

[56] References Cited

U.S. PATENT DOCUMENTS

| | | | |
|---|---|---|---|
| 2,429,340 | 10/1947 | Bailey | 264/230 |
| 2,719,324 | 10/1955 | Gray et al. | 425/392 |
| 2,980,963 | 4/1961 | Makowski | 264/150 |
| 3,086,242 | 4/1963 | Cook et al. | 264/230 |
| 3,370,112 | 2/1968 | Wray | 264/568 |
| 3,554,999 | 1/1971 | Shaw et al. | 264/230 |
| 3,687,585 | 8/1972 | Takagi et al. | 264/567 |
| 3,949,110 | 4/1976 | Nakajima et al. | 264/230 |

FOREIGN PATENT DOCUMENTS 45-16597  9/1970  Japan .................................. 264/564

*Primary Examiner*—Jeffery R. Thurlow
*Attorney, Agent, or Firm*—Zarley, McKee, Thomte, Voorhees & Sease

[57] ABSTRACT

The present invention discloses an improved heat shrinkable sleeve and method for making same in which an extruded sleeve piece is heated above the cross-linking temperature of the plastics material by immersing it in a heated bath while supporting its shape by fixed tubes and then expanding the sleeve piece while it is simultaneously cooled by means of a pair of rotating rolls which are movable away from each other.

8 Claims, No Drawings

METHOD OF MANUFACTURING SHRINKABLE SLEEVES FROM A CROSS-LINKING PLASTICS MATERIAL

This invention relates to improvements in tubular articles known as shrinkable sleeves, and more particularly to improved methods of manufacturing such shrinkable sleeves from cross-linking plastics material. The manufacture of heat shrinkable sleeves from cross-linking plastics material has already been known. Such sleeves are used, for example, in the sealing of connections in coated cables or coating joints in tubing and piping and the like. Such sleeves are manufactured, for example, by extruding the plastics material which can be cross-linked. A sleeve must be extruded at a temperature below the cross-linking temperature of the plastic. The finished sleeve has substantially its extruded dimensions and at the point of use the sleeve is placed over the joint to be sealed and heated with a burner or hot air blower to the cross-linking temperature of the plastics material, whereby the sleeve shrinks due to the cross-linking reaction of the plastics material. The cross-linking reaction can also be effected with high energy irradiation.

As a raw material for such sleeves, for example, polymer plastics that can be cross-linked with the help of peroxides, such as polyethylene, chlorinated polyethylene, chlorosulphonated polyethylene, ethylenepropylene copolymer, plasticized polyvinyl chloride among others, can be used. The previously known shrinkable sleeves are suitable for many applications, but they also have their limitations. Firstly, the degree of shrinkage due to the cross-linking reaction is not sufficient, for example, for applications where the joint to be sealed is formed by two cables or tubes of different diameter, or possibly of two parallel wires or tubes. Furthermore, many of the cross-linking plastics materials which can be considered have a rather high cross-linking temperature in the order of 140° C. to 180° C. which may encounter restrictions on the possibility of heating the joints in question. Also many plastics melt partially or at least soften considerably at their cross-linking temperatures, thus exhibiting a very poor capacity for retaining their shape and resulting in an uneven sealing effect. The heating can also damage the pipes or the cables to be sealed. Additionally, energy irradiation is not a very effective cross-linking method for tubes having a larger wall thickness as the energy irradiation can penetrate the sleeve wall to a depth of only about 0.5 to 0.6 mm. These sleeves also tend to shrink in their longitudinal direction, which can lead to an insufficient sealing of the joint.

In attempting to overcome problems associated with the known shrink sleeves such as inadequate shrinkage, high cross-linking temperature, and the longitudinal shrinking, a method has been suggested, according to U.S. Pat. No. 3,086,242, by Cook et al, for the manufacture of heat-shrinkable tubular articles, according to which method a tubular material extruded from a cross-linkable plastics material is heated to a temperature above its cross-linking temperature so that the cross-linking of the platsics material takes place. Thereafter, the tubular material is cooled and simultaneously expanded in its radial direction, by differential pressure, whereby the material, when cooled, is retained in its expanded state. The expanded state can then be unlocked by reheating the tube, the thereby returning substantially to its extruded shape and dimension. During the said reheating stage the tube does not have to be heated to as high a temperature as during the cross-linking reaction, and the disadvantage connected with the high temperature heating is thus partially eliminated. It is possible to expand the tube at a diameter being four to eight times the extruded diameter with a corresponding high degree of shrinkage as compared to that obtained with cross-linking only.

The above methods, however, still have their drawbacks. On the one hand it is difficult to control and make certain that a tube retains it shape at the cross-linking temperature at which the tube changes into a substantially plasticized state. On the other hand the cross-linked tube is expanded in the process of Cook et al by blowing air into the tube at a suitable pressure whereby the tube is expanded to a degree by the internal pressure. There is then, however, the risk that the expansion takes place unevenly and in an uncontrolled manner at different areas in the tube sidewall, which causes irregularlities in the sidwall thickness of the final expanded product. A natural consequence of this is that the tube, during heating, shrinks unevenly so that the joint will not be sealed tightly enough. Sophisticated equipment is required.

These problems relating to the shape stability and uneven expansion are overcome by the present invention in which the sleeve piece, which has been extruded at a temperature below its cross-linking temperature, is cut into lengths corresponding substantially to the length of the finished sleeve, or a multiple thereof, the cut sleeve is then heated to the cross-linking temperature of the plastics material while being held in a supported or fixed position, both on its exterior and interior side, and the substantially cross-linked sleeve piece is then expanded during simultaneous cooling to the desired sleeve diameter by running it around two or more rotating, parallel rolls, which can be moved away from each other. The present invention further encompasses techniques whereby the sleeve piece, during heating to cross-linking temperature, is retained in the annular space between two coaxial tubes of different diameter, each respective adjacent the inner and outer surfaces of the sleeve piece, and the sleeve piece so supported is lowered into an oil bath, the temperature of which is slightly above the desired cross-linking temperature of the plastic of sleeve piece. Furthermore, to effect cooling while expanding, the rotating rolls may be cooled to lower the temperature of the sleeve piece, and the surface of the rotating rolls are provided with rills, grooves, or other textured features to increase the surface friction against the sleeve piece. A shrink sleeve made in accordance with the foregoing practices of the present invention exhibits uniform and desirable characteristics in application. The complex equipment of Cook et al is not required.

A better understanding of the invention may be gleaned from the following description and example.

In the method of the present invention, the sleeve pieces from the extruder, cut to length, are held in a supported position and relatively fixed shape during the heating in the annular space provided between two coaxial tubes, of metal or other rigid material. The coaxial tube assembly, with its inserted sleeve piece, is lowered into a heated medium, such as for example an oil bath, the temperature of which is above the cross-linking temperature of the plastic of the sleeve pieces. Thus, the sleeve does not lose its shape or dimension substantially and its wall thickness does not change appreciably at selected locations when the material is plasticized during the heating. When the plastics material has been cross-linked, the sleeve pieces may be removed from the bath and withdrawn from the tubular retaining means as the cross-linking has changed the physical properties of the plastics material in such a way that the sleeve can be moved even at the temperature of the bath without any flow or distortion taking place in its walls which could give rise to changes in strength or thickness. An alternative means to retain the shape of the cut sleeve piece during the cross-linking heating stage and the oil bath is to place the sleeve in a single hollow tube having an inner diameter equivalent to the outer diameter of the sleeve piece and to close the ends of the tube so that the sleeve piece can be held by a slight internal overpressure against the inner surface of the tube wall. The internal pressure can be advantageously achieved by injecting some of the aforementioned heated bath oil into the interior of the tube and sleeve.

The next step in the method according to this invention is cooling and simultaneous expansion of the sleeve piece, which should ideally be performed so that the expansion takes place evenly at all points on the sidewall of the sleeve. This expansion stage is carried out in accordance with the present invention by placing the sleeve piece removed from the bath and the retaining means onto two or more, ideally paralle, side-by-side rolls so that the loop formed by the sleeve will extend around and over the rolls, which are rotated at the same peripheral speed, and are also movable apart or away from each other in order to stretch or expand the diameter of the sleeve loop. In order to ensure that the expansion takes place uniformly, it is advantageous to provide the surface of the rolls with a series of rills, grooves or some other texture to make it grip the sleeve in some way. The rolls may preferably be cooled in order to speed up the process of cooling the sleeve during expansion. The sleeve piece runs arouud on the rotating rolls during the expansion stage more or less like a stretched ribbon around the rotating rolls and is expanded when the rolls are moved away from each other in a direction perpendicular to their parallel axes as it is cooled to a temperature at which the expanded state is stable or frozen. This rotating movement around the rolls ensures that the sleeve wall is not expanded unevenly, so that a uniform sleeve is obtained. Thus, the sleeve is expanded in this stage in a radial direction to obtain the desired expanded diameter.

When the finished sleeve has been placed over a joint or connection to be sealed, the sleeve is heated to a temperature at which the expanded state of the plastic is unlocked and the sleeve returns by shrinkage substantially to the size and state prevailing before the expansion period. The method of the present invention is described in further detail in the following Example.

EXAMPLE

From polyethylene containing in addition about 2.0% by weight of dicumyl peroxide as a cross-linking agent for the polyethylene, a tube having a diameter of 100 mm. and a wall thickness of about 2.20 mm. is extruded in an extruder provided with a cooler. The tube is cut into sleeve pieces having a length of about 700 mm. which are placed in the space between two coaxial concentric tubes of unequal diameter, the space between them substantially corresponding to the thickness of the sleeve wall. The tube assembly and the interposed sleeve piece are lowered for about six minutes into an oil bath, the temperature of which is about 180° C. After said time period the sleeve pieces are removed from the bath and the space between the retaining tubes and placed on two expansion rolls. The rolls are provided with built-in water cooling and their temperature is about 50° C. to 60° C. The rolls are driven in rotation and can be moved away from each other in a direction perpendicular to their parallel axes. By means of the rotating and separating rolls, the sleeve is expanded in a radial direction about 60% during the period of about one and one-half minutes during which time the temperature of the sleeve falls to about 80° C. The sleeve piece is cut into final sleeve length, is removed, and further cooled and cleaned of any attached oil, and the sleeve is ready for use. When the sleeve is heated to a temperature of about 130° C. it shrinks to a diameter of about 100.5 mm. No appreciable shrinkage in the longitudinal direction takes place.

As is known, the degree of cross-linking is dependent on the temperature and may vary even for the same plactics material within a fairly wide range. If the reaction temperature is lowered, naturally the reaction time has to be prolonged correspondingly.

While the foregoing disclosure includes examples of specific embodiments of the present invention, it will be realized that modifications and variations thereof may be employed without departing from the inventive concept herein.

What I claim as new and desire to protect by Letters Patent of the United States is as follows:

1. Method of manufacturing heat-shrinkable sleeves from cross-linkable plastics materials by extruding a sleeve piece as a tube at a temperature below the cross-linking temperature of the plastic material, but cutting the sleeve piece tube into lengths corresponding substantially to the length of the finished sleeve or a multiple thereof, by heating the cut sleeve piece to the cross-linking temperature of the plastics material while fixed both at its exterior and interior side and by expanding the sleeve piece during simultaneous cooling to the desired sleeve diameter, the improvement comprising, that the sleeve piece is expanded when placed as a loop around two or more rotating parallel rolls which are moved away from each other said two or more rotating parallel rolls are oriented so that their axes are parallel to the longitudinal direction of the sleeve piece.

2. Method according to claim 1 wherein the expansion rolls are cooled during the expansion stage of the sleeve piece.

3. Method according to claim 1 wherein the expansion rolls are rotated at the same peripheral speed.

4. Method according to any one of the claims 2 to 3 wherein the jacket surface of the expansion rolls are provided with rills, grooves or are worked in some other way to increase the surface friction.

5. A heat shrinkable sleeve as made in accordance with the method of claim 1.

6. A heat shrinkable sleeve as made in accordance with the method of claim 2.

7. A heat shrinkable sleeve as made in accordance with the method of claim 3.

8. A heat shrinkable sleeve as made in accordance with the method of claim 4.

* * * * *